United States Patent
Shi

(10) Patent No.: US 10,346,344 B2
(45) Date of Patent: Jul. 9, 2019

(54) METHOD, CLIENT DEVICE AND DATA FORWARDING DEVICE FOR TRANSMITTING DATA THROUGH SERIAL PORT

(71) Applicant: Goertek Inc., Shandong (CN)

(72) Inventor: Guoliang Shi, Shandong (CN)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 15/743,533

(22) PCT Filed: Aug. 11, 2017

(86) PCT No.: PCT/CN2017/097097
§ 371 (c)(1),
(2) Date: Jan. 10, 2018

(87) PCT Pub. No.: WO2018/232899
PCT Pub. Date: Dec. 27, 2018

(65) Prior Publication Data
US 2019/0079894 A1    Mar. 14, 2019

(51) Int. Cl.
*G06F 13/42* (2006.01)
*H04L 12/46* (2006.01)
*H04L 12/40* (2006.01)

(52) U.S. Cl.
CPC .... *G06F 13/4282* (2013.01); *H04L 12/40071* (2013.01); *H04L 12/4633* (2013.01); *G06F 2213/0002* (2013.01)

(58) Field of Classification Search
CPC .......... G06F 13/4282; H04L 12/40071; H04L 12/4633
See application file for complete search history.

(56) References Cited

U.S. PATENT DOCUMENTS 6,073,183 A * 6/2000 Slonim ................ G06F 13/385
710/3
2004/0131064 A1* 7/2004 Burwell .............. H04L 12/4608
370/397
(Continued)

FOREIGN PATENT DOCUMENTS

CN   101470688 A   7/2009
CN   101621440 A   1/2010
(Continued)

OTHER PUBLICATIONS

International Search Report and Written Opinion, dated Mar. 23, 2018, for International Application No. PCT/CN2017/097097.

*Primary Examiner* — Glenn A. Auve
(74) *Attorney, Agent, or Firm* — Alston & Bird LLP

(57) ABSTRACT

The present invention discloses a method, a client device, and a data forwarding device for transmitting data through a serial port. The method comprises providing at least two virtual logical serial ports mapped to a physical serial port, providing a main serial port connected to the physical serial port and extended serial ports which correspond to the logical serial ports one by one; encapsulating first data and a specified logical serial port according to a preset serial port protocol to obtain a first data frame; transmitting the first data frame to the data forwarding device through the physical serial port; receiving the first data frame through the main serial port, and decapsulating the first data frame according to the serial port protocol to obtain the first data and the specified logical serial port; and transmitting the first data to the extended serial port corresponding to the specified logical serial port.

17 Claims, 5 Drawing Sheets

(56) References Cited

U.S. PATENT DOCUMENTS

| | | | | |
|---|---|---|---|---|
| 2005/0149651 A1* | 7/2005 | Doak | ............ | G06F 13/387 |
| | | | | 710/52 |
| 2008/0126072 A1* | 5/2008 | Hutchison | ............ | G06F 11/261 |
| | | | | 703/25 |
| 2015/0271303 A1* | 9/2015 | Neginhal | ............ | H04L 12/46 |
| | | | | 370/392 |
| 2016/0248601 A1* | 8/2016 | Nomi | ............ | H04L 12/4641 |

FOREIGN PATENT DOCUMENTS

| | | |
|---|---|---|
| EP | 2495913 A1 | 9/2012 |
| WO | 2012006824 A1 | 1/2012 |
| WO | 2017021764 A1 | 2/2017 |

\* cited by examiner

METHOD, CLIENT DEVICE AND DATA FORWARDING DEVICE FOR TRANSMITTING DATA THROUGH SERIAL PORT

CROSS-REFERENCE TO RELATED APPLICATIONS

This application is a National Stage Application, filed under 35 U.S.C. § 371, of International Application No. PCT/CN2017/097097, filed on Aug. 11, 2017, which claims priority to Chinese Patent Application No. 201710488731.9, filed on Jun. 23, 2017, the contents of both of which as are hereby incorporated by reference in their entireties.

BACKGROUND

Related Field

The present invention relates to the field of data transmission, and in particular, to a method for transmitting data through a serial port, a client device for transmitting data through a serial port, and a data forwarding device for transmitting data through a serial port.

Description of Related Art

A serial interface is also referred to as a serial port (which generally refers to a COM interface), which means that data is transmitted bit by bit and is characterized by a simple communication circuit that may realize bidirectional communication just by means of a pair of transmission lines, thereby greatly reducing the cost.

An application operating on the client device may perform data transmission with an external device through a serial port of the client device. Since the client device typically has only one physical serial port and one physical serial port can only connect to one external device in principle, this limits the number of external devices that can interact with the application through the client device. Therefore, it is very necessary to provide a solution that can perform data transmission with a plurality of external devices through one physical serial port.

BRIEF SUMMARY

An objective of an embodiment of the present invention is to provide a new technical solution for transmitting data through a serial port.

According to the first aspect of the present invention, there is provided a method for transmitting data through a serial port. The method comprises the following steps:

Providing, by a client device, at least two virtual logical serial ports which are mapped to a physical serial port, the physical serial port being a physical serial port on the client device for connecting an external device;

Providing, by a data forwarding device, a main serial port connected to the physical serial port, and extended serial ports which correspond to the logical serial ports one by one;

Encapsulating first data and a specified logical serial port according to a preset serial port protocol, in response to a writing operation of the first data transmitted through the specified logical serial port, to obtain a first data frame;

Transmitting, by the client device, the first data frame to the data forwarding device through the physical serial port;

Receiving, by the data forwarding device, the first data frame through the main serial port, and decapsulating the first data frame according to the serial port protocol to obtain the first data and the specified logical serial port; and Transmitting, by the data forwarding device, the first data to the extended serial port corresponding to the specified logical serial port.

According to the second aspect of the present invention, there is further provided a client device for transmitting data through a serial port. The client device comprises:

A physical serial port;

A virtual mapping module configured to provide at least two virtual logical serial ports which are mapped to the physical serial port;

A first encapsulation module configured to encapsulate first data and a specified logical serial port according to a preset serial port protocol, in response to a writing operation of the first data transmitted through the specified logical serial port, to obtain a first data frame; and A first transmission module configured to transmit the first data frame to a data forwarding device through the physical serial port, for the data forwarding device to decapsulate the first data frame to obtain the first data according to the serial port protocol and transmit the first data to the extended serial port corresponding to the specified logical serial port.

According to the third aspect of the present invention, there is further provided a data forwarding device for transmitting data through a serial port. The data forwarding device comprises:

A main serial port configured to connect a physical serial port of a client device;

At least two extended serial ports, each extended serial port configured to connect an external device;

A second receiving module configured to receive a first data frame transmitted by the client device through the main serial port, the first data frame being encapsulated with first data and a virtual logical serial port corresponding to one extended serial port;

A second decapsulation module configured to decapsulate the first data frame according to a serial port protocol to obtain the first data and the logical serial port; and A forwarding module configured to transmit the first data to the extended serial port corresponding to the logical serial port.

The present invention has the following beneficial effect. The client device provides a plurality of virtual logical serial ports, which are mapped to a physical serial port of the client device, to an application mounted thereon. The client device is connected to the main serial port of the data forwarding device through the physical serial port, and these logical serial ports correspond to the extended serial ports provided by the data forwarding device one by one, such that the application on the client device may directly communicate with an external device connected to the corresponding extended serial port by performing reading, writing and other operations on any of the logical serial ports, thereby realizing a purpose of communication between one physical serial port and a plurality of external devices.

BRIEF DESCRIPTION OF THE FIGURES

The accompanying drawings, which are incorporated in and constitute a part of the specification, illustrate embodiments of the invention and, together with the description thereof, serve to explain the principles of the invention.

DETAILED DESCRIPTION OF VARIOUS EMBODIMENTS

Various exemplary embodiments of the present invention will now be described in detail with reference to the accompanying drawings. It should be noted that these examples are merely illustrative and are in no way intended to limit the present invention, and its application or use.

<Hard Configuration>

Figure 1:
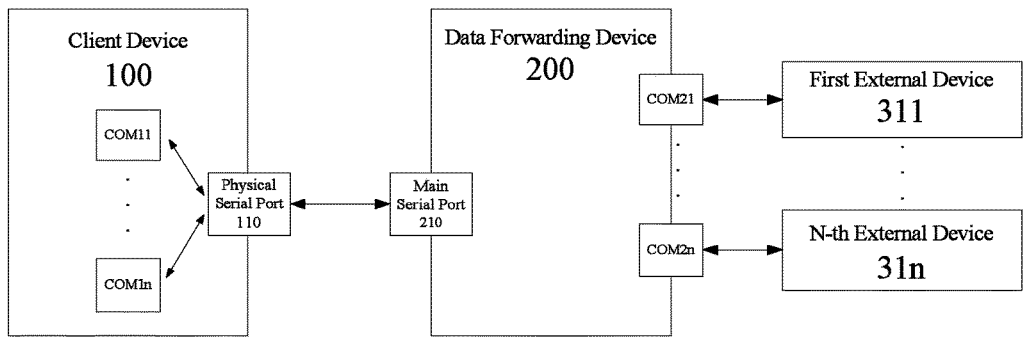
FIG. 1 is a hardware configuration for a method for transmitting data through a serial port according to an embodiment of the present invention.

FIG. 1 is a hardware structure configuration for a method for transmitting data through a serial port according to an embodiment of the present invention.

As shown in FIG. 1, the hardware structure configuration for implementing the method for transmitting data through a serial port according to the embodiment of the present invention comprises a client device 100, a data forwarding device 200, and external devices 311-31n, wherein n is an integer larger than or equal to 2.

The client device 100 provides a physical serial port 110 which may be a physical port on the client device 100 for connecting the external devices.

The client device 100 further provides at least two virtual logical serial ports COM11-COM1n which are mapped to the physical serial port 110.

The data forwarding device 200 provides a main serial port 210 which is connected to the physical serial port 110.

The data forwarding device 200 further provides extended serial ports COM21-COM2n which correspond to the logical serial ports COM11-COM1n one by one.

The above physical serial port 110 may be, for example, RS232 or RS485.

The above extended serial ports COM21-COM2n, the main serial port 210 and the physical serial port 110 are of the same type.

Each of the extended serial ports COM21-COM2n may be connected to one external device; for example, the extended serial port COM21 is connected to the first external device 311, and the extended serial port COM2n is connected to the n-th external device 31n.

The client device 100 provides encapsulated logical serial ports COM11-COM1n to an application (hereinafter referred to as a client application for short) mounted thereon, such that the client application may perform reading, writing and other operations on the logical serial ports as with using the physical serial port, and may directly make use of the method for transmitting data through the serial port according to the embodiment of the present invention without performing task modification, thereby ensuring the transportability of the client application.

The data forwarding device 200 may perform mapping from the logical serial ports COM11-COM1n to the corresponding extended serial ports COM21-COM2n, and further map the operation of the logical serial ports COM11-COM1n through the client application to the operation of the corresponding extended serial ports COM21-COM2n, thereby realizing the communication between the client application and different external devices.

In the present embodiment, one client application may communicate with one external device or a plurality of external devices; different client applications may communicate with the same external device or respectively communicate with different external devices.

The external devices 311-31n may be equipment, for example, an air condition or a projector, that may perform communication through a serial port.

In another embodiment, the client device 100 may also provide an additional physical serial port, and the additional physical serial port may also be mapped to at least two additional virtual logical serial ports as with being mapped to the physical serial port 110.

<Method>

Figure 2:
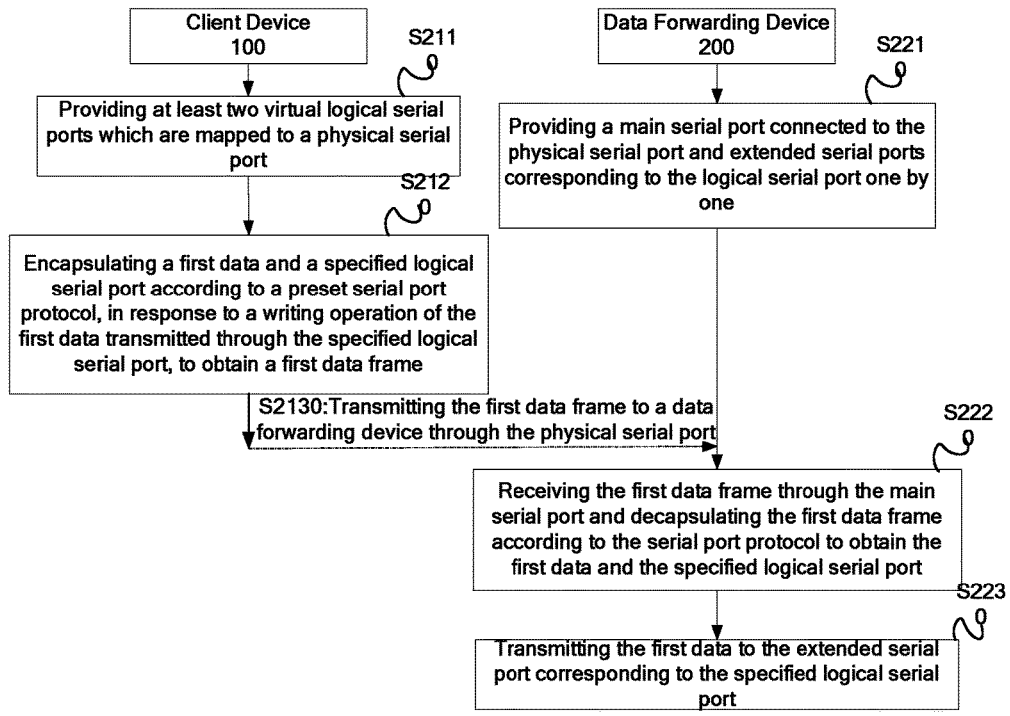
FIG. 2 is a flow diagram of a method for transmitting data through a serial port according to an embodiment of a writing operation of the present invention.

FIG. 2 is a flow diagram of a method for transmitting data through a serial port according to an embodiment of a writing operation of the present invention, in which the solid line indicates an internal processing flow of the client device 100 and the data forwarding device 200, and the dotted line indicates an interaction flow between the client device 100 and the data forwarding device 200.

As shown in FIG. 2, the method for transmitting data through the serial port according to the embodiment of the writing operation of the present invention comprises the following steps.

In the step S2110, the client device 100 provides at least two virtual logical serial ports (such as the logical serial ports COM11-COM1n in FIG. 1) which are mapped to a physical serial port (e.g., the physical serial port 110 in FIG. 1), the physical serial port being a physical serial port on the client device 100 for connecting an external device.

The client device 100 provides logical serial port files corresponding to the logical serial ports one by one, for the client application to operate the corresponding logical serial ports through the logical serial port files, e.g., opening the logical serial ports, configuring the logical serial ports, performing a writing operation on the logical serial ports, performing a reading operation on the logical serial ports, closing the logical serial ports and the like.

The operation of the client application to the logical serial ports through the logical serial port files will cause a calling of an operating system level, and further realizes the communication between the client application and the external devices.

In the step S2210, the data forwarding device 200 provides a main serial port (e.g., the main serial port 210 in FIG. 1) connected to the physical serial port, and extended serial ports (e.g., the extended serial ports COM21-COM2n in FIG. 1) corresponding to the logical serial ports one by one.

The data forwarding device 200 is connected to external devices through the extended serial ports, wherein each extended serial port may be used to connect one external device.

In the step S2120, the client device 100 encapsulates first data and a specified logical serial port according to a preset serial port protocol, in response to a writing operation of the first data transmitted through the specified logical serial port, to obtain a first data frame.

The writing operation is triggered by the client application.

The client application may execute the writing operation through the logical serial port file of the specified logical serial port.

The writing operation may include the first data, a length of the first data, etc.

According to the serial port protocol, the client application may, prior to executing the writing operation, open the corresponding logical serial ports to clarify the specified logical serial port.

The logical serial port specified by the client application may be set by a user, or by default.

In the step S2130, the client device 100 transmits the first data frame to the data forwarding device 200 through the physical serial port 110.

In the step S2220, the data forwarding device 200 receives the first data frame through the main serial port 210, and decapsulate the first data frame according to the serial port protocol to obtain the first data and the specified logical serial port.

The data forwarding device 200 and the client device 100 may perform encapsulation, decapsulation and other operations based on the same serial port protocol, to ensure the identifiability of the two parties and normal proceeding of the communication.

In the step S2230, the data forwarding device 200 transmits the first data obtained by decapsulation to the extended serial port corresponding to the specified logical serial port.

The data forwarding device 200 executes a mapping operation between the logical serial ports and the extended serial ports in the step S2230.

In the present embodiment, the data forwarding device 200 may store a mapping table which reflects a mapping relationship between the logical serial ports and the extended serial ports.

It can be seen that, according to the method of the present embodiment of the present invention, the client device 100 may provide a plurality of virtual logical serial ports, that are mapped to the physical serial ports 110, to the client application, the client device 100 being connected to the main serial port 210 of the data forwarding device 200 through the physical serial port 110, such that the data forwarding device 200 realizes the forwarding of data to the corresponding extended serial ports through the mapping relationship between the logical serial ports and the extended serial ports. Therefore, as with operating the physical serial port, the client application may communicate with the external device connected to the corresponding extended serial port directly by means of operations, such as a writing operation, to the specified logical serial port, thereby realizing a purpose that the client application communicates with a plurality of external devices through one physical serial port 110. In addition, the client application requires no modification and has transportability.

Figure 3:
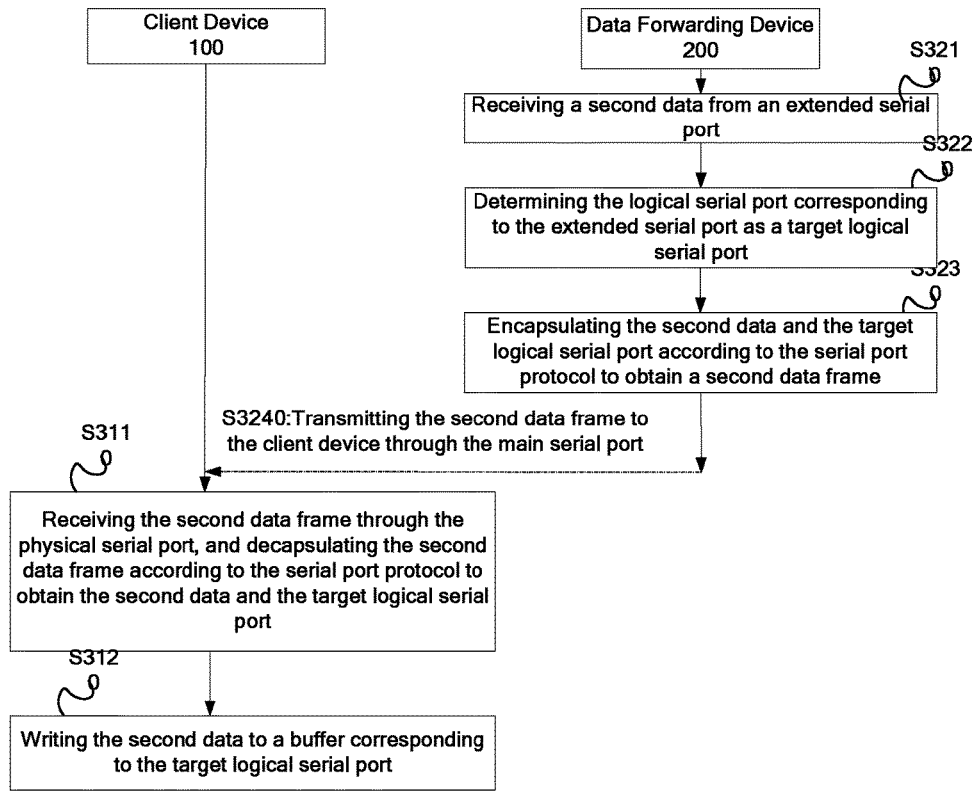
FIG. 3 is a flow diagram of a method for transmitting data through a serial port according to an embodiment of a reading operation of the present invention.

FIG. 3 is a flow diagram of a method for transmitting data through a serial port according to an embodiment of a reading operation of the present invention, in which the solid line indicates an internal processing flow of the client device 100 and the data forwarding device 200, and the dotted line indicates an interaction flow between the client device 100 and the data forwarding device 200.

As shown in FIG. 3, the method for transmitting data through the serial port according to the embodiment of the reading operation of the present invention may comprise the following steps.

In the step S3210, the data forwarding device 200 receives second data from an extended serial port.

For example, the extended serial port is a first extended device 311 in FIG. 1.

In the step S3220, the data forwarding device 200 determines a logical serial port corresponding to the extended serial port as a target logical serial port.

In an example in which the extended serial port is the first extended device 311, the target logical serial port is a logical serial port COM1 which is mapped to the first extended device 311.

In the step S3230, the data forwarding device 200 encapsulates the second data and the target logical serial port according to the serial port protocol to obtain a second data frame.

In the step S3240, the data forwarding device 200 transmits the second data frame to the client device 100 through the main serial port 210.

In the step S3110, the client device 100 receives the second data frame through the physical serial port 110, and decapsulates the second data frame according to the serial port protocol to obtain the second data and the target logical serial port.

In the step S3120, the client device 100 writes the second data into a buffer corresponding to the target logical serial port.

According to the step S3120, when the client application performs a reading operation (e.g., directly calling a read function operating a serial port) on the target logical serial port, it will cause a calling of a read interface function of an operating system level. The read interface function will check whether data is present in the buffer of the target logical serial port, returns the data to the client application if the data is present, or determines whether to wait data here according to whether or not operating system settings are blocked.

It can thus be seen that, according to the method of the present embodiment of the present invention, the client application may read data from a plurality of external devices through a physical serial port 110, wherein the data from the external devices is mapped to the corresponding logical serial port after being processed by the data forwarding device 200, such that, as with operating the physical serial port, the client application may acquire data transmitted by the external device connected to the corresponding extended serial port by directly performing a reading operation on the logical serial port, thereby realizing the purpose that the client application communicates with the plurality of external devices through one physical serial port 110. In addition, the client application requires no modification and has transportability.

Based on the embodiment of FIG. 2, the method of the present invention further comprises the following steps.

In the step S4110, the client device 100 sets a checksum when the first data frame is obtained by encapsulation.

The checksum may be calculated according to a preset check algorithm, such as a CRC8 algorithm.

The checksum is located on a field in the first data frame, which is defined according to a serial port protocol, for example, a field at the end of the first data frame and occupying 1 byte.

The checksum is calculated, for example, from a set field in the first data frame according to the preset check algorithm.

The set field includes at least the first data, and may further include the specified logical serial port, and the like.

In the step S4210, the data forwarding device 200 verifies the correctness of the first data frame according to the obtained checksum after decapsulation.

In the step S4210, the data forwarding device 200 acquires the checksum set by the client device 100 with respect to the first data frame by decapsulation.

The data forwarding device 200, after acquiring the checksum set by the client device 100, calculates a new checksum with respect to the received first data frame according to the same check algorithm by which the client device 100 sets the checksum.

If the new checksum calculated by the data forwarding device 200 is the same as the checksum obtained by decapsulation, it is indicated that the content of the first data frame is correct, and the confirming of the first data frame is correct. If the new checksum calculated by the data forwarding device 200 is not the same as the checksum obtained by decapsulation, it is indicated that the content of the first data frame has a fault, and the first data frame fails to pass upon confirming.

In the step S4220, the data forwarding device 200 transmits the first data obtained by decapsulation to an extended serial port corresponding to the specified logical serial port after the confirming of the first data frame is correct.

In the same way, based on the embodiment of FIG. 3, the method of the present invention further comprises the following steps.

In the step S5210, the data forwarding device 200 sets a checksum when the second data frame is obtained by encapsulation.

In the step S5110, the client device 100 verifies the correctness of the second data frame according to the checksum obtained by decapsulation.

In the step S5120, the client device 100 writes the second data into a buffer corresponding to the target logical serial port after the confirming of the second data frame is correct.

According to the method of the present embodiment of the present invention, the accuracy of data transmission between the client application and the external devices may be improved by increasing the confirming loop described above.

Based on the embodiment of FIG. 2, the method according to the embodiment of the present invention further comprises the following step.

In the step S6110, the client device 100 obtains a transmission sequence number of the first data transmitted through the specified logical serial port in response to a writing operation of the first data transmitted through the specified logical serial port, and encapsulates the transmission sequence number in the first data frame according to the serial port protocol.

According to the step S6110, the client device 100 may perform respective sequential numbering on the data frame transmitted through each logical serial port respectively according to the serial port protocol. The client device 100 may also perform unified sequential numbering on the data frame transmitted through each logical serial port according to the serial port protocol.

With the respective sequential numbering described above as an example, it is set that the logical serial port specified in the step S6110 is the logical serial port COM1 in FIG. 1; if the transmission of the first data is the first transmission operation performed through the logical serial port COM1, the transmission sequence number is 0X01; if the transmission of the first data is the second transmission operation performed through the logical serial port COM1, the transmission sequence number is 0X02, and so on.

In the same way, based on the embodiment of FIG. 3, the method according an embodiment of the present invention further comprises the following step.

In the step S7210, the data forwarding device 200 may obtain a transmission sequence number of the second data transmitted to a target logical serial port after determining the target logical serial port, and also encapsulate the transmission sequence number in the second data frame according to the serial port protocol.

According to the method of the present embodiment of the present invention, by setting the transmission sequence number of data transmitted with respect to the logical serial port, it is possible to record the data transceiving condition for each logical serial port, which facilitates, for example, confirming of the data frames, debugging of data transmission and the like.

Based on the embodiment in which the first data frame includes the transmission sequence number, the method according to the embodiment of the present invention further comprises the following steps.

In the step S6210, the data forwarding device 200 returns a receipt acknowledgment response with respect to the first data frame to the client device 100 after decapsulating the first data frame according to the serial port protocol, the receipt acknowledgment response including the transmission sequence number or an acknowledgment number of the transmission sequence number.

In the step S6210, the data forwarding device 200 and the client device 100 may agree on a corresponding relation between the transmission sequence number and the acknowledgment number.

For example, the transmission sequence number includes characters representing the specified logical serial ports, characters representing the transmission operation, and serial numbers of the sequential sequencing, while the corresponding acknowledgment number includes character representing the specified logical serial port and serial numbers of the sequential sequencing therein; but the characters representing the transmission operation are replaced with characters indicating receipt acknowledgment.

In the step S6120, after transmitting the first data frame to the data forwarding device 200 through the physical serial port, the client device 100 detects whether the receipt acknowledgment response returned by the data forwarding device 200 is received within a pre-set time according to the transmission sequence number or the acknowledgment number corresponding to the transmission sequence number, transmits a next data frame if it is received with the pre-set time, or retransmits the first data frame to the data forwarding device 200 through the physical serial port according to a detection result that the receipt acknowledgment response is not received within the pre-set time, till the receipt acknowledgment response returned by the data forwarding device 200 is received.

In the same way, based on the embodiment in which the second data frame includes the transmission sequence number, the method according to the embodiment of the present invention further comprises the following steps.

In the step S7110, the client device 100 returns a receipt acknowledgment response with respect to the second data frame to the data forwarding device 200 after decapsulating the second data frame according to the serial port protocol, the receipt acknowledgment response including the transmission sequence number decapsulated from the second data frame or an acknowledgment number corresponding to the transmission sequence number.

In the step S7220, after transmitting the second data frame to the client device 100 through the main serial port, the data forwarding device 200 detects whether the receipt acknowledgment response returned by the client device 100 is received within a pre-set time according to the transmission sequence number of the second data transmitted to the target logical serial port or the acknowledgment number corresponding to the transmission sequence number, transmits a next data frame if it is received within the pre-set time, or retransmits the second data frame to the client device 100 through the main serial port according to a detection result that the receipt acknowledgment response is not received within the pre-set time, till the receipt acknowledgment response returned by the client device 100 is received.

According to the method of the present embodiment of the present invention, it is possible to ensure that no data frame is lost in the data transmission by setting the receipt acknowledgment response step, thereby improving the reliability of data transmission.

The above embodiment in which the receipt acknowledgment response is set may be combined with the embodiment in which the data frame confirming is set, such that the data forwarding device 200 may further return the receipt acknowledgment response with respect to the first data frame to the client device 100 after the confirming of the first data frame is correct. In the same way, the client device 100 may further return the receipt acknowledgment response with respect to the second data frame to the data forwarding device 200 after the confirming of the second data frame is correct.

According to the method of the present embodiment of the present invention, it is possible to ensure that no data frame is lost by setting the confirming step and the receipt acknowledgment response step, and also to ensure the accuracy of the data frames.

Based on the embodiment in FIG. 2, the client device 100 and the data forwarding device 200 may transmit data at a default Baud rate agreed by a sender and a receiver, such that the client application may directly perform a writing operation after opening the logical serial port files.

In addition, the client device 100 may inform the data forwarding device 200 through the configuration instruction to configure a Baud rate at which data is forwarded to the corresponding extended serial port. To that end, the method according to the embodiment of the present invention may further comprise the following steps.

Prior to the client device 100 responding to a writing operation of the first data transmitted through the specified logical serial port, the method further comprises the following steps.

In the step S8110, the client device 100 encapsulates configuration content and the specified logical serial port, in response to an operation of configuring the designated logical serial port, to obtain a configuration instruction, the operation of configuring the specified logical serial port being triggered by calling a configuration function by the client application;

In the step S8120, the client device 100 transmits the configuration instruction to the data forwarding device 200 through the physical serial port;

In the step S8210, the data forwarding device 200 receives a configuration instruction through the main serial port, and decapsulates the configuration instruction through the serial port protocol to obtain the configuration content and the specified logical serial port; and In the step S8220, the data forwarding device 200 configures an extended serial port corresponding to the specified logical serial port according to the configuration content.

This configuration includes a configuration of the Baud rate at which data is forwarded to the extended serial port corresponding to the specified logical serial port.

With the method of the present embodiment of the present invention, the client application may freely select the Baud rate for data transmission as needed.

EXAMPLE

According to the serial port protocol, a frame format for data/instructions transmitted between the client device 100 and the data forwarding device 200 is shown in Table 1 below:

TABLE 1

| Frame Format | | | | | | | |
|---|---|---|---|---|---|---|---|
| Data Head | Type Identification | Logical Serial Port ID | Transmission sequence number | Length | | Transmission Content | Checksum |
| 0xFA 0XF5 | 0x02: Instruction 0X01: Response 0X00: Data | Indicating that the transmission content comes from/is transmitted to the logical serial ports | 0x01 | Sum of lengths of Transmission Content and Checksum | | . . . | 0xC7 |
| 2 BYTE | 1 BYTE | 1 BYTE | 1 BYTE | 1 BYTE | | . . . | 1 BYTE |

According to Table 1, the frame format in this example may include the data head, the type identification (including data, instructions, receipt acknowledgment response, etc.) of the transmission content, the logical serial port ID, the transmission sequence number, the length, the transmission content and the checksum, wherein the length is the sum of the numbers of bytes of the transmission content and the checksum.

According to Table 1, in the frame format in this example, the data head, the type of the transmission content, the logical serial port ID, the transmission sequence number, the length and the checksum occupy 2 bytes, 1 byte, 1 byte, 1 byte, 1 byte and 1 byte respectively.

According to the above frame format, referring to FIG. 1, the frame format of data 0x01 and 0x02 transmitted by the client device 100 to the first external device 311 through the logical serial port COM11 of the client device 100 is shown in Table 2 below.

TABLE 2

| Data Head | Type(Data) | ID of COM11 | Transmission sequence number | Length | Transmission Content | | Checksum |
|---|---|---|---|---|---|---|---|
| 0xFA 0XF5 | 0x00 | 0x01 | 0x01 | 0x03 | 0x01 | 0x02 | 0xC7 |

According to the above frame format, referring to FIG. 1, the frame format of the extended serial port COM21 configured by the client application through the logical serial port COM11 of the client device 100 is shown in Table 3 below.

TABLE 3

| Data Head | Type(Data) | ID of COM1 | Transmission sequence number | Length | Transmission Content | Checksum |
|---|---|---|---|---|---|---|
| 0xFA 0XF5 | 0x02 | 0x01 | 0x02 | 0x08 | | 0x69 |

The transmission content in Table 3 is shown in Table 4 below:

TABLE 4

| Transmission Content | | | | | | |
|---|---|---|---|---|---|---|
| 0x00 | 0x01 | 0xC2 | 0x00 | 0x08 | 0x01 | 0x4E |

Figure 4:
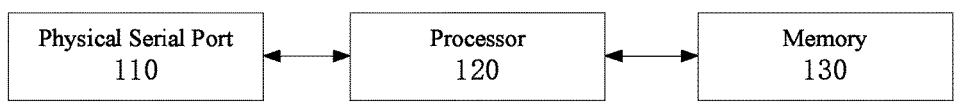
FIG. 4 is a functional block diagram of a hardware structure of a client device according to an embodiment of the present invention.

The transmission content illustrated in FIG. 4 is a Baud rate 115200 for configuring the extended serial port COM21, and the serial port attribute is 8N1, wherein "8" represents 8 data bits, "N" represents no parity check, and "1" represents a stop bit.

According to the above frame format, referring to FIG. 1, the receipt acknowledgment response of the data frame having the transmission sequence number of 0x01, which is transmitted by the data forwarding device 200 with respect to the logical serial port COM11, is shown in Table 5 below:

TABLE 5

| Data Head | Type(Data) | ID of COM11 | Transmission sequence number | Length | Transmission Content | Checksum |
|---|---|---|---|---|---|---|
| 0xFA 0XF5 | 0x01 | 0x01 | 0x01 | 0x01 | 0x01 | 0x71 |

<Hardware Structure>

FIG. 4 is a functional block diagram of a hardware structure of a client device 100 according to an embodiment of the present invention.

As shown in FIG. 4, the client device 100 of the present embodiment includes the physical serial port 110 in FIG. 1, a processor 120 and a memory 130.

The memory 130 is used for storing instructions, the instructions being used for controlling the processor 120 to operate to execute the method for transmitting data through the serial port according to the present invention.

The memory 130 may include a high speed random access memory, and may also include a nonvolatile memory, such as one or more magnetic storage devices, a flash memory, or other nonvolatile solid state memory.

The processor 120 may be a central processing unit CPU, a micro controlling unit MCU or the like.

The physical serial port 110 may be, for example, RS232 or RS485.

The client device 100 may further comprise a display device, an input device, etc. The display device may be, for example, a display screen, a touch screen, or the like. The input device may be, for example, a keyboard, a mouse, a touch screen, or the like.

Figure 5:
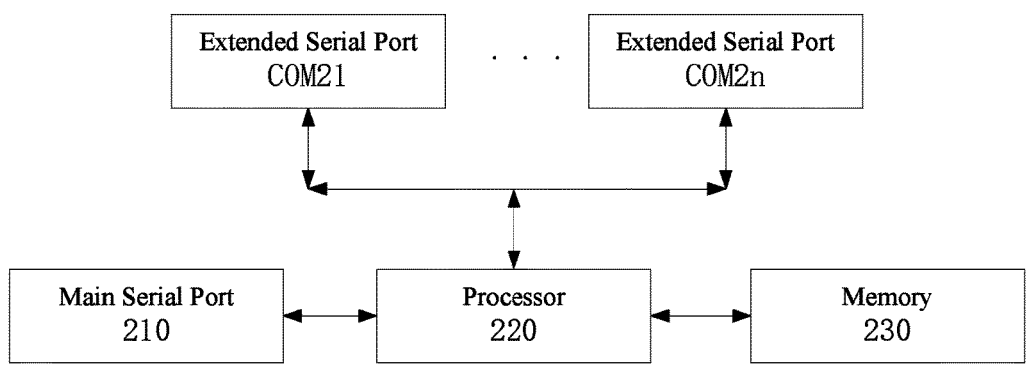
FIG. 5 is a functional block diagram of a hardware structure of a data forwarding device according to an embodiment of the present invention.

FIG. 5 is a functional block diagram of a hardware structure of a data forwarding device 200 according to an embodiment of the present invention.

As shown in FIG. 5, the client device 100 according to the present embodiment comprises the main serial port 210 in FIG. 1, a processor 220, a memory 230 and extended serial ports COM21-COM2n, wherein n is an integer larger than or equal to 2.

The memory 230 is used for storing instructions, the instructions being used for controlling the processor 220 to operate to execute the method for transmitting data through the serial port according to the present invention.

The memory 230 may include a high speed random access memory, and may also include a nonvolatile memory, such as one or more magnetic storage devices, a flash memory, or other nonvolatile solid state memory.

The processor 220 may be a micro controlling unit MCU, or the like.

The main serial port 210 and the extended serial ports COM21-COM2n may be, for example, RS232, RS485, or the like.

<Client Device>

Figure 6:
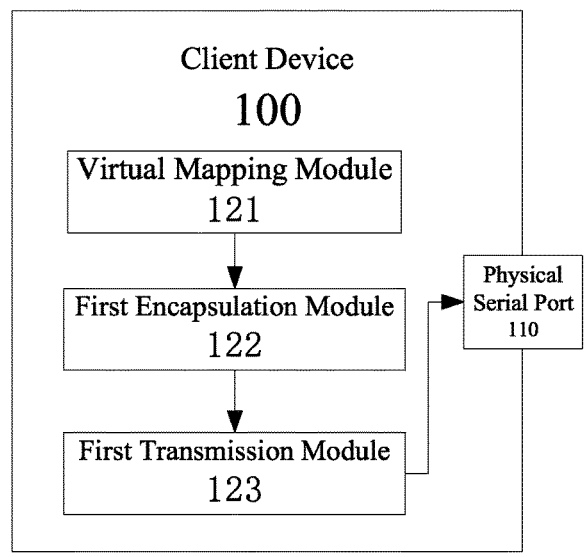
FIG. 6 is a functional block diagram of a client device according to an embodiment of the writing operation of the present invention.

FIG. 6 is a flow diagram of the client device 100 for transmitting data through a serial port according to an embodiment of a writing operation of the present invention.

As shown in FIG. 6, the client device 100 according to the present embodiment of the present invention comprises the physical serial port 110, a virtual mapping module 121, a first encapsulation module 122 and a first transmission module 123.

The virtual mapping module 121 is configured to provide at least two virtual logical serial ports, which are mapped to the physical serial port 110.

The first encapsulation module 122 is configured to encapsulate first data and a specified logical serial port according to a preset serial port protocol, in response to a writing operation of first data transmitted through a specified logical serial port, to obtain a first data frame.

The first transmission module 123 is configured to transmit the first data frame to a data forwarding device 200 through the physical serial port 110, for the data forwarding device 200 to decapsulate the first data from the first data frame according to the serial port protocol and transmit the first data to the extended serial port corresponding to the specified logical serial port.

Figure 7:
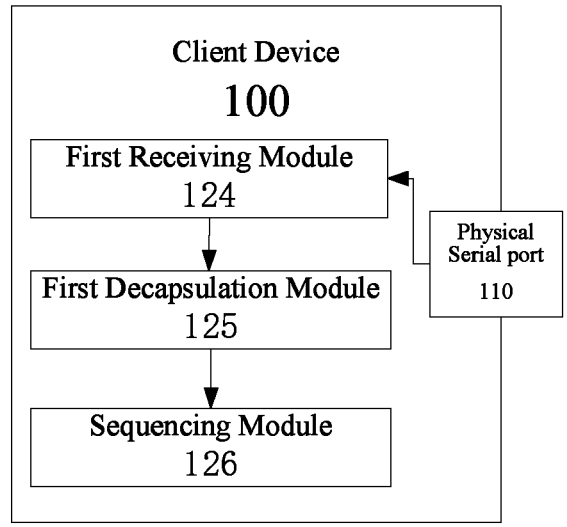
FIG. 7 is a functional block diagram of a client device according to an embodiment of the reading operation of the present invention.

FIG. 7 is a flow diagram of a client device for transmitting data through a serial port according to an embodiment of a reading operation of the present invention.

As shown in FIG. 7, the client device 100 according to the present embodiment of the present invention may further comprise a first receiving module 124, a first decapsulation module 125 and a sequencing module 126.

The first receiving module 124 is configured to receive a second data frame transmitted by the data forwarding device 200 through the physical serial port 110, the second data frame being encapsulated with second data and a target logical serial port corresponding to the extended serial port providing the second data.

The first decapsulation module 125 is configured to decapsulate the second data frame to obtain the second data and the target logical serial port corresponding to the second data.

The sequencing module 126 is configured to write the second data to a buffer of the target logical serial port corresponding to the second data.

Further, the client device 100 for transmitting data through the serial port according to the embodiment of the reading operation of the present invention may further comprise a first checksum setting module (not shown in the drawings).

The first checksum setting module is configured to set a checksum when the first data frame is obtained by encapsulation performed by the first encapsulation module 122, such that the data forwarding device 200 transmits the first data obtained by decapsulation to the extended serial port corresponding to the specified logical serial port after the confirming of the first data frame according to the checksum is correct.

Further, the client device 100 for transmitting data through the serial port according to the embodiment of the reading operation of the present invention may further comprise a first confirming module (not shown in the drawings).

The first confirming module is configured to: acquire a checksum, which is obtained by decapsulating the second data frame by the first decapsulation module 125 and set by the data forwarding device 200 with the respect to the second data frame, verify the correctness of the second data frame according to the acquired checksum, and inform the sequencing module 126 to write the second data into a buffer of a target logical serial port corresponding to the second data if the confirming of the second data frame is correct.

Further, the client device 100 for transmitting data through the serial port according to an embodiment of the reading operation of the present invention may further comprise a first receipt acknowledgment module (not shown in the drawings).

The first receipt acknowledgment module is configured to return a receipt acknowledgment response with respect to the second data frame to the data forwarding device 200 after the first receiving module 124 receives the second data frame, such that the data forwarding device 200 may retransmit the second data frame to the client device 100 if the receipt acknowledgment response is not received within a pre-set time.

The first receipt acknowledgment module may also return the receipt acknowledgment response with respect to the second data frame to the data forwarding device 200 after the first confirming module checks that the second data frame passes.

Further, the client device 100 for transmitting data through the serial port according to the embodiment of the writing operation of the present invention may further comprise a first sequence number setting module (not shown in the drawings).

The first sequence number setting module is configured to obtain a transmission sequence number of the first data transmitted through the specified logical serial port when responding to a writing operation of the first data transmitted through the specified logical serial port, such that the first encapsulation module 122 encapsulates the transmission sequence number in the first data frame according to the serial port protocol.

Furthermore, the client device 100 for transmitting data through the serial port according to the embodiment of the writing operation of the present invention may further comprise a first receipt acknowledgment judgment module (not shown in the drawings).

The first receipt acknowledgment judgment module is configured to: detect whether a receipt acknowledgment response returned by the data forwarding device 200 with respect to the first data frame is received within a pre-set time according to the transmission sequence number or an acknowledge number corresponding to the transmission sequence number, the receipt acknowledge response including the transmission sequence number or the acknowledge number corresponding to the transmission sequence number; inform the first transmission module 123 to transmit a next data frame if it is received within the pre-set time, and inform the first transmission module 123 to retransmit the first data frame to the data forwarding device through the physical serial port 110 if it is not received within the pre-set time.

Further, the client device 100 for transmitting data through the serial port according to the embodiment of the writing operation of the present invention may further comprise a configuration module (not shown in the drawings).

The configuration module is configured to: respond to an operation of configuring a specified logical serial port before the first encapsulation module 122 responds to a writing operation of the first data transmitted through the specified logical serial port, to encapsulate configuration content and the specified logical serial port according to the serial port protocol to obtain a configuration instruction, and inform the first transmission module 123 to transmit the configuration instruction to the data forwarding device 200 through the physical serial port 110, for the data forwarding device 200 to configure an extended serial port corresponding to the specified logical serial port according to the configuration content obtained by decapsulation.

<Data Forwarding Device>

Figure 8:
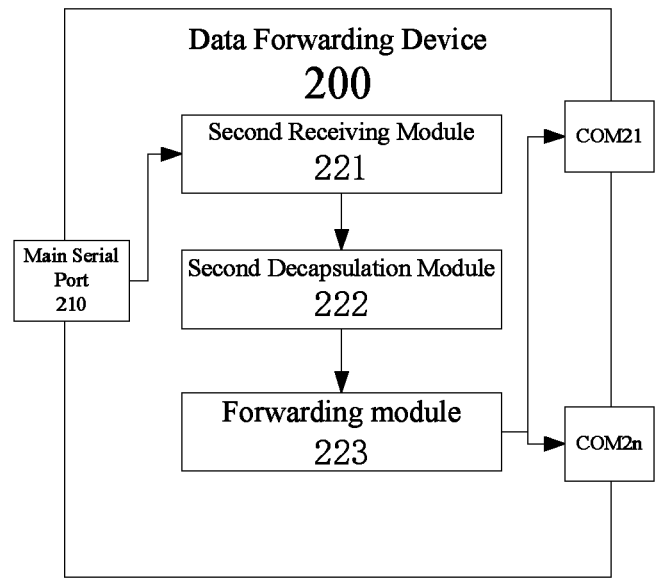
FIG. 8 is a functional block diagram of a data forwarding device according to an embodiment of the writing operation of the present invention.

FIG. 8 is a functional block diagram of a data forwarding device for transmitting data through a serial port according to an embodiment of a writing operation of the present invention.

As shown in FIG. 8, the data forwarding device 200 according to the present embodiment further comprises a main serial port 210, at least two extended serial ports COM21-COM2n (in which, n is an integer larger than or equal to 2), a second receiving module 221, a second decapsulation module 222 and a forwarding module 223.

The main serial port 210 is configured to connect the physical serial port 110 of the client device 100.

Each of the at least two extended serial ports COM21-COM2n is configured to connect an external device.

The second receiving module 221 is configured to receive a first data frame transmitted by the client device 100 through the main serial port 210, the first data frame being encapsulated with first data and a virtual logical serial port corresponding to one extended serial port.

The second decapsulation module 222 is configured to decapsulate the first data frame according to a serial port protocol to obtain the first data and the corresponding logical serial port.

The forwarding module 223 is configured to transmit the first data to the extended serial port corresponding to the logical serial port.

Figure 9:
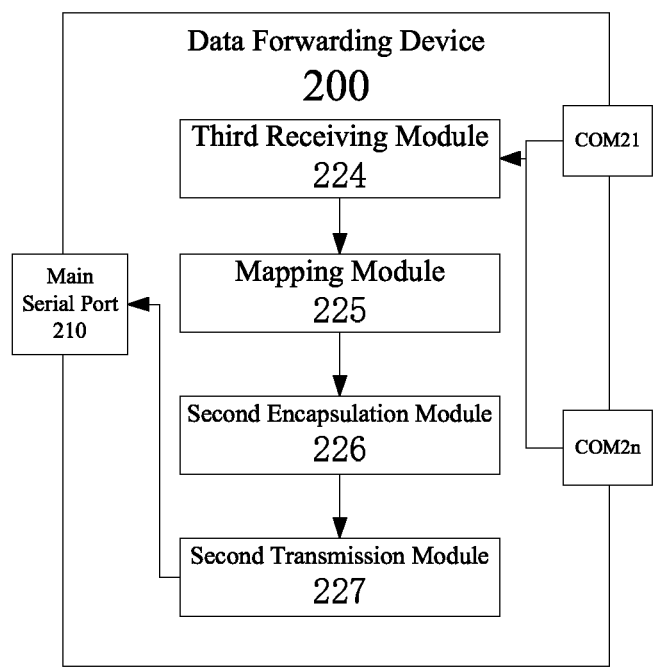
FIG. 9 is a functional block diagram of a data forwarding device according to an embodiment of the reading operation of the present invention.

FIG. 9 is a functional block diagram of a data forwarding device for transmitting data through a serial port according to an embodiment of a reading operation of the present invention.

As shown in FIG. 9, the data forwarding device 200 according to the present embodiment may further include a third receiving module 224, a mapping module 225, a second encapsulation module 226 and a second transmission module 227.

The third receiving module 224 is configured to receive second data from the extended serial port.

The mapping module 225 is configured to determine the virtual logical serial port corresponding to the extended serial port providing the second data as a target logical serial port.

The second encapsulation module 226 is configured to encapsulate the second data and the target logical serial port according to the serial port protocol to obtain a second data frame.

The second transmission module 227 is configured to transmit the second data frame to the client device 100 through the main serial port, for the client device 100 to decapsulate the second data and the target logical serial port from the second data frame, and write the second data to a buffer of the target logical serial port.

Further, the data forwarding device 200 for transmitting data through the serial port according to the embodiment of the writing operation of the present invention may further comprise a second confirming module (not shown in the drawings).

The second confirming module is configured to: acquire a checksum, which is obtained by decapsulating the second data frame by the second decapsulation module 222 and set by the client device 100 with the respect to the first data frame, verify the correctness of the first data frame according to the acquired checksum, and inform the forwarding module 223 to transmit the first data to an extended serial port corresponding to the logical serial port if the confirming of the first data frame is correct.

Further, the data forwarding device 200 for transmitting data through the serial port according to the embodiment of the reading operation of the present invention may further comprise a second checksum setting module (not shown in the drawings).

The second checksum setting module is configured to set a checksum when the second data frame is obtained by encapsulation performed by the second encapsulation module 226, such that the client device 100 writes the second data to into a buffer of the target logical serial port after the confirming of the second data frame according to the checksum is correct.

Further, the data forwarding device 200 for transmitting data through the serial port according to the embodiment of the writing operation of the present invention may further comprise a second receipt acknowledgment module (not shown in the drawings).

The second receipt acknowledgment module is configured to return a receipt acknowledgment response with respect to the first data frame to the client device 100 after the second receiving module 221 receives the first data frame, such that the client device 100 may retransmit the first data frame to the data forwarding device 200 if the receipt acknowledgment response is not received within a pre-set time.

The second receipt acknowledgment module may further return the receipt acknowledgment response with respect to the first data frame to the client device 100 after the second confirming module confirms that the first data frame passes.

Further, the data forwarding device 200 for transmitting data through the serial port according to the embodiment of the reading operation of the present invention may further comprise a second sequence number setting module (not shown in the drawings).

The second sequence number setting module is configured to obtain a transmission sequence number of the second data transmitted to the target logical serial port, such that the second encapsulation module 226 also encapsulates the transmission sequence number in the second data frame according to the serial port protocol.

Furthermore, the data forwarding device 200 for transmitting data through the serial port according to the embodiment of the reading operation of the present invention may further comprise a second receipt acknowledgment module (not shown in the drawings).

The second receipt acknowledgment judgment module is configured to: detect whether a receipt acknowledgment response returned by the client device 100 with respect to the second data frame is received within a pre-set time according to the transmission sequence number or an acknowledge number corresponding to the transmission sequence number, the receipt acknowledgment response including the transmission sequence number set by the second sequence number setting module or the acknowledge number corresponding to the transmission sequence number; inform the second transmission module 227 to transmit a next data frame if it is received within the pre-set time; and inform the second transmission module 227 to retransmit the second data frame to the client device 100 through the main serial port 210 if it is not received within the pre-set time.

Further, the data forwarding device 200 for transmitting data through the serial port according to the embodiment of the writing operation of the present invention may further comprise a configuration execution module (not shown in the drawings).

The configuration execution module is configured to decapsulate configuration content from a configuration instruction transmitted by the client device 100 through the main serial port 210 and configure a corresponding logical serial port, and configure an extended serial port corresponding to the logical serial port according to the configuration content.

The field technician is known that, with the electronic information technology such as large scale integrated circuit technology development trend of hardware and software, it is becoming more difficult to differentiate clearly computer system hardware and software. Because any operation can be implemented by software or by hardware. The execution of any instruction can be done by the hardware, as well as by software. Whether a hardware implementation or a software implementation plan is adopted for a particular machine function depends on the non-technical factors such as price, speed, reliability, storage capacity, and change cycle. Therefore, for the general technical personnel in the field of electronic information technology, the way to describe a technical solution more directly and clearly is to describe the various operations in the scheme. In the case of knowing the operation to be performed, the technical personnel in the field can design the desired product directly based on the non-technical considerations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

What is claimed is:

1. A method for transmitting data through a serial port, the method comprising the following steps:
   providing, by a client device, at least two virtual logical serial ports which are mapped to a physical serial port, the physical serial port being a physical serial port on the client device for connecting an external device;
   providing, by a data forwarding device, a main serial port connected to the physical serial port and extended serial ports which correspond to the logical serial ports one by one;
   encapsulating, by the client device, a first data and a specified logical serial port according to a preset serial port protocol, in response to a writing operation of the first data transmitted through the specified logical serial port, to obtain a first data frame;
   setting, by the client device, a checksum when the first data frame is obtained by encapsulation;
   transmitting, by the client device, the first data frame to the data forwarding device through the physical serial port;
   receiving, by the data forwarding device, the first data frame through the main serial port, and decapsulating the first data frame according to the serial port protocol to obtain the first data and the specified logical serial port;
   verifying, by the data forwarding device, the correctness of the first data frame according to the obtained checksum after decapsulation; and
   transmitting, by the data forwarding device, the first data obtained by decapsulation to the extended serial port corresponding to the specified logical serial port after confirming the first data frame is correct.

2. The method according to claim 1 further comprising the following steps:
   receiving, by the data forwarding device, a second data from an extended serial port;
   determining, by the data forwarding device, the logical serial port corresponding to the extended serial port as a target logical serial port;
   encapsulating, by the data forwarding device, the second data and the target logical serial port according to the serial port protocol to obtain a second data frame;
   transmitting, by the data forwarding device, the second data frame to the client device through the main serial port;
   receiving, by the client device, the second data frame through the physical serial port, and decapsulating the second data frame according to the serial port protocol to obtain the second data and the target logical serial port; and
   writing, by the client device, the second data into a buffer corresponding to the target logical serial port.

3. The method according to claim 1, further comprising the following steps:
   obtaining, by the client device, a transmission sequence number of the first data transmitted through the specified logical serial port when responding to the writing operation of the first data transmitted through the specified logical serial port, and encapsulating the transmission sequence number in the first data frame according to the serial port protocol.

4. The method according to claim 3, further comprising the following steps:
   returning, by the data forwarding device, a receipt acknowledgment response with respect to the first data frame to the client device after decapsulating the first data frame according to the serial port protocol, the receipt acknowledgment response including the transmission sequence number or an acknowledgment number corresponding to the transmission sequence number; and
   after transmitting, by the client device, the first data frame to the data forwarding device through the physical serial port:
      detecting whether the receipt acknowledgment response returned by the data forwarding device is received within a pre-set time according to the transmission sequence number or the acknowledgment number corresponding to the transmission sequence number; and
      retransmitting the first data frame to the data forwarding device through the physical serial port according to a detection result that the receipt acknowledgment response is not received within the pre-set time.

5. The method according to claim 1, further comprising the following steps:
   before the client device responding to the writing operation of the first data transmitted through the specified logical serial port:
      encapsulating configuration content and the specified logical serial port according to the serial port protocol, in response to an operation of configuring the specified logical serial port, to obtain a configuration instruction;
      transmitting the configuration instruction to the data forwarding device through the physical serial port;
      receiving, by the data forwarding device, the configuration instruction through the main serial port, and decapsulating the configuration instruction according to the serial port protocol to obtain the configuration content and the specified logical serial port; and configuring, by the data forwarding device, the extended serial port corresponding to the specified logical serial port according to the configuration content.

6. A client device for transmitting data through a serial port comprising:
a physical serial port;
a virtual mapping module configured to provide at least two virtual logical serial ports which are mapped to the physical serial port;
a first encapsulation module configured to encapsulate a first data and a specified logical serial port according to a preset serial port protocol, in response to a writing operation of the first data transmitted through the specified logical serial port, to obtain a first data frame;
a first transmission module configured to transmit the first data frame to a data forwarding device through the physical serial port, for the data forwarding device to decapsulate the first data frame and obtain the first data according to the serial port protocol and transmit the first data to an extended serial port corresponding to the specified logical serial port; and
a first checksum setting module configured to set a checksum when the first data frame is obtained by encapsulation performed by the first encapsulation module, so that the data forwarding device transmits the first data obtained by decapsulation to the extended serial port corresponding to the specified logical serial port after confirming the first data frame according to the checksum is correct.

7. The client device according to claim 6, further comprising:
a first receiving module configured to receive a second data frame transmitted by the data forwarding device through the physical serial port, the second data frame being encapsulated with a second data and a target logical serial port corresponding to an extended serial port that provides the second data;
a first decapsulation module configured to decapsulate the second data frame to obtain the second data and the target logical serial port corresponding to the second data; and
a sequencing module configured to write the second data to a buffer of the target logical serial port corresponding to the second data.

8. The client device according to claim 7, further comprising:
a first verifying module configured to acquire a checksum, which is obtained by decapsulating the second data frame by the first decapsulation module and set by the data forwarding device with the respect to the second data frame, verify the correctness of the second data frame according to the acquired checksum, and inform the sequencing module to write the second data into a buffer of the target logical serial port corresponding to the second data if confirming the second data frame is correct.

9. The client device according to claim 6, further comprising:
a first sequence number setting module configured to obtain a transmission sequence number of the first data transmitted through the specified logical serial port when the first encapsulation module responds to the writing operation of the first data transmitted through the specified logical serial port, so that the first encapsulation module encapsulates the transmission sequence number in the first data frame according to the serial port protocol.

10. The client device according to claim 9, further comprising:
a first receipt acknowledgment judgment module configured to: detect whether a receipt acknowledgment response returned by the data forwarding device with respect to the first data frame is received within a pre-set time according to the transmission sequence number or an acknowledgment number corresponding to the transmission sequence number, the receipt acknowledgment response including the transmission sequence number or the acknowledgment number corresponding to the transmission sequence number; inform the first transmission module to transmit a next data frame if it is received within the pre-set time, and inform the first transmission module to retransmit the first data frame to the data forwarding device through the physical serial port if it is not received within the pre-set time.

11. The client device according to claim 6, further comprising:
a configuration module configured to respond to an operation of configuring a specified logical serial port before the first encapsulation module responds to the writing operation of the first data transmitted through the specified logical serial port, to encapsulate configuration content and the specified logical serial port according to the serial port protocol to obtain a configuration instruction, and inform the first transmission module to transmit the configuration instruction to the data forwarding device through the physical serial port, so that the data forwarding device configures an extended serial port corresponding to the specified logical serial port according to the configuration content obtained by decapsulation.

12. A data forwarding device for transmitting data through a serial port comprising:
a main serial port configured to connect a physical serial port of a client device;
at least two extended serial ports, each extended serial port configured to connect an external device;
a second receiving module configured to receive a first data frame transmitted by the client device through the main serial port, the first data frame being encapsulated with a first data and a virtual logical serial port corresponding to one extended serial port;
a second decapsulation module configured to decapsulate the first data frame according to a serial port protocol to obtain the first data and the logical serial port;
a forwarding module configured to transmit the first data to the extended serial port corresponding to the logical serial port; and
a second verifying module configured to acquire a checksum, which is obtained by decapsulating the first data frame by the second decapsulation module and set by the client device with the respect to the first data frame, verify correctness of the first data frame according to the acquired checksum, and inform the forwarding module to transmit the first data to an extended serial port corresponding to the logical serial port if confirming the first data frame is correct.

13. The data forwarding device according to claim 12 further comprising:
a third receiving module configured to receive a second data from the extended serial port;

a mapping module configured to determine the virtual logical serial port corresponding to the extended serial port providing the second data as a target logical serial port;

a second encapsulation module configured to encapsulate the second data and the target logical serial port according to the serial port protocol to obtain a second data frame; and a second transmission module configured to transmit the second data frame to the client device through the main serial port, for the client device to decapsulate the second data and the target logical serial port from the second data frame and write the second data to a buffer of the target logical serial port.

14. The data forwarding device according to claim 13 further comprising:

a second checksum setting module configured to set a checksum when the second data frame is obtained by encapsulation performed by the second encapsulation module, so that the client device writes the second data into a buffer of the target logical serial port after confirming the second data frame according to the checksum is correct.

15. The data forwarding device according to claim 13 further comprising:

a second sequence number setting module configured to determine a transmission sequence number of the second data transmitted to the target logical serial port, so that the second encapsulation module further encapsulates the transmission sequence number in the second data frame according to the serial port protocol.

16. The data forwarding device according to claim 15 further comprising:

a second receipt acknowledgment judgment module configured to:

detect whether a receipt acknowledgment response returned by the client device with respect to the second data frame is received within a pre-set time according to the transmission sequence number or an acknowledgment number corresponding to the transmission sequence number, the receipt acknowledgment response including the transmission sequence number set by the second sequence number setting module or the acknowledgment number corresponding to the transmission sequence number;

inform the second transmission module to transmit a next data frame if it is received within the pre-set time, and inform the second transmission module to retransmit the second data frame to the client device through the main serial port if it is not received within the pre-set time.

17. The data forwarding device according to claim 12 further comprising:

a configuration execution module configured to decapsulate a configuration instruction transmitted by the client device through the main serial port and obtain configuration content and a specified logical serial port corresponding to the configuration content, and configure the extended serial port corresponding to the logical serial port according to the configuration content.

* * * * *

UNITED STATES PATENT AND TRADEMARK OFFICE
CERTIFICATE OF CORRECTION

PATENT NO. : 10,346,344 B2
APPLICATION NO. : 15/743533
DATED : July 9, 2019
INVENTOR(S) : Shi It is certified that error appears in the above-identified patent and that said Letters Patent is hereby corrected as shown below:

On the Title Page

Insert:
--(30) Foreign Application Priority Data
Jun 23, 2017 (CN)................................................2017 1 0488731.9--

Signed and Sealed this
Twenty-sixth Day of November, 2019

Andrei Iancu
*Director of the United States Patent and Trademark Office*